United States Patent
Flynn et al.

(10) Patent No.: US 8,175,917 B2
(45) Date of Patent: May 8, 2012

(54) METHOD AND APPARATUS FOR CUSTOMER SPECIFIC BASED FOOD PREPARATION PREDICTION

(75) Inventors: Tracy L. Flynn, Alpharetta, GA (US); Alaa E. Pasha, Dacula, GA (US)

(73) Assignee: NCR Corporation, Duluth, GA (US)

(*) Notice: Subject to any disclaimer, the term of this patent is extended or adjusted under 35 U.S.C. 154(b) by 224 days.

(21) Appl. No.: 12/260,349

(22) Filed: Oct. 29, 2008

(65) Prior Publication Data

US 2009/0265216 A1  Oct. 22, 2009

Related U.S. Application Data

(60) Provisional application No. 61/124,361, filed on Apr. 16, 2008.

(51) Int. Cl.
  *G07G 1/00* (2006.01)
  *G07G 1/14* (2006.01)

(52) U.S. Cl. ........ 705/14; 705/14.23; 705/26.7; 705/15; 705/10

(58) Field of Classification Search ............ 705/26, 705/14.2, 15, 37, 26.81, 10, 26.7, 14.19; 709/203; 53/474; 219/681, 710, 702, 703
See application file for complete search history.

(56) References Cited

U.S. PATENT DOCUMENTS

| | | | | |
|---|---|---|---|---|
| 4,922,435 A * | 5/1990 | Cahlander et al. | ............ | 700/247 |
| 5,132,914 A * | 7/1992 | Cahlander et al. | ............ | 700/211 |
| 5,172,328 A * | 12/1992 | Cahlander et al. | ............ | 700/211 |
| 6,842,719 B1 * | 1/2005 | Fitzpatrick et al. | ............ | 702/182 |
| 7,392,206 B1 * | 6/2008 | Frazier et al. | ................ | 705/26.7 |
| 7,493,362 B2 * | 2/2009 | Bogatin et al. | ................ | 709/203 |
| 7,680,690 B1 * | 3/2010 | Catalano | ......................... | 705/15 |
| RE41,449 E * | 7/2010 | Krahnstoever et al. | ........... | 701/1 |
| 2002/0059311 A1 * | 5/2002 | Nishina | ........................ | 707/200 |
| 2004/0044578 A1 * | 3/2004 | Kim et al. | ....................... | 705/15 |
| 2004/0069313 A1 * | 4/2004 | DeLaquil | ...................... | 128/921 |
| 2004/0158494 A1 * | 8/2004 | Suthar | ............................ | 705/15 |
| 2005/0086117 A1 * | 4/2005 | Kanisawa et al. | ............... | 705/26 |
| 2005/0154560 A1 * | 7/2005 | Fitzpatrick et al. | ........... | 702/182 |
| 2005/0273345 A1 * | 12/2005 | Castillejo Romero | ............ | 705/1 |
| 2006/0259547 A1 * | 11/2006 | Bogatin et al. | ................ | 709/203 |
| 2007/0088620 A1 * | 4/2007 | Tengler et al. | .................. | 705/26 |
| 2007/0088624 A1 * | 4/2007 | Vaughn et al. | .................. | 705/26 |
| 2007/0094090 A1 * | 4/2007 | Jenkins et al. | .................. | 705/26 |
| 2007/0106565 A1 * | 5/2007 | Coelho | ........................... | 705/26 |
| 2007/0150375 A1 * | 6/2007 | Yang | ................................ | 705/26 |
| 2007/0162325 A1 * | 7/2007 | Singer-Harter | ................ | 705/10 |

(Continued)

OTHER PUBLICATIONS

Bodapati, A.. "Recommendation Systems with Purchase Data." JMR, Journal of Marketing Research 45.1 (2008): 77. ABI/INFORM Global, ProQuest. Web. Nov. 15, 2011.*

*Primary Examiner* — Matthew Gart
*Assistant Examiner* — Olusegun Goyea
(74) *Attorney, Agent, or Firm* — Peter Priest

(57) ABSTRACT

A food preparation predicting system and method in one embodiment includes a detector for obtaining customer information, a memory including program instructions for obtaining customer information from the detector, associating the customer information with stored customer specific preference information, generating a pseudo-order based upon the associated preference information, generating food preparation information based upon the pseudo-order, and displaying the food preparation information, and a processor operably connected to the camera and the memory for executing the program instructions.

20 Claims, 3 Drawing Sheets

U.S. PATENT DOCUMENTS

| | | | |
|---|---|---|---|
| 2008/0189172 A1* | 8/2008 | Goren et al. | 705/14 |
| 2008/0294500 A1* | 11/2008 | Koether et al. | 705/10 |
| 2009/0070250 A1* | 3/2009 | Adcock et al. | 705/37 |
| 2009/0134151 A1* | 5/2009 | Bogatin et al. | 219/681 |
| 2009/0181131 A1* | 7/2009 | Forbes-Roberts | 426/106 |
| 2009/0236333 A1* | 9/2009 | Ben-Shmuel et al. | 219/702 |
| 2009/0236334 A1* | 9/2009 | Ben-Shmuel et al. | 219/703 |
| 2009/0236335 A1* | 9/2009 | Ben-Shmuel et al. | 219/710 |
| 2009/0241481 A1* | 10/2009 | Sus et al. | 53/474 |
| 2009/0255195 A1* | 10/2009 | Bridgman et al. | 52/174 |

\* cited by examiner

METHOD AND APPARATUS FOR CUSTOMER SPECIFIC BASED FOOD PREPARATION PREDICTION

CROSS-REFERENCE TO RELATED APPLICATION

The present application claims the benefit of the filing date of Provisional Application Ser. No. 61/124,361, filed Apr. 16, 2008.

FIELD OF THE INVENTION

The present invention relates generally to the restaurant industry and, more specifically, to restaurants with drive-thru services.

BACKGROUND OF THE INVENTION

Restaurants which feature drive-thru windows strive to provide food products to customers in a quick and convenient manner. In many such restaurants, sales through the drive-thru windows account for fifty to eighty percent of the total sales of the restaurant. Accordingly, the success of such businesses depends on the rapid provision of the desired food product. One of the main delays in providing service to customers is the delay in preparing the food order. The delay may be ameliorated by prior preparation of the food products on the restaurant's menu. Food products may be prepared and kept in a warming area so that restaurant employees can quickly assemble a food order from the products in the warming area, bag it, and hand it to a customer. This approach decreases the time needed to serve customers thereby making the drive-thru service more efficient.

The trade-off with the foregoing approach is that sufficient numbers of products must be prepared without knowledge of the tendencies of any particular customer. Thus, if a business inaccurately predicts the number of a particular product that will be ordered, the product served may not be fresh, thereby disenfranchising a customer. Alternatively, products may be scrapped after a predetermined time in the warming area. In either event, the business may suffer loss either directly due to spoilage or indirectly through loss of customers. Therefore, accurately determining the number of different products to be kept in the warming area or other staging area is critical to the success of a restaurant.

Generally, prediction as to the amount of product that will be sold is fairly accurate over longer periods of time. For example, a prediction of the expected sales for a particular month based upon the sales in the previous month is fairly reliable. Such predictions can further be modified to account for seasonal, promotional and event based changes in product demand with relative accuracy. Monthly predictions, however, do not provide the information necessary to maintain an optimum number of products in a staging area for a particular time of day. Even hourly predictions are of limited value when a product has a shelf life on the order of minutes.

In another approach to food product preparation management, a computer program may be used to predict the number of products to be maintained in a staging area based upon the sales data for the product over some immediately previous time frame. Thus, the number of products to be prepared is a function of the number of products just sold. This approach, while using data which is relatively fresh, is still based upon historical data which is not necessarily indicative of actual future activity.

Therefore, a need exists for a system which increases the accuracy of a restaurant's prediction of the demand for particular products. What is further needed is a system and method which is responsive to the historical tendencies of specific customers.

SUMMARY OF THE INVENTION

A food preparation predicting system and method in one embodiment includes a detector for obtaining customer information, a memory including program instructions for obtaining customer information from the detector, associating the customer information with stored customer specific preference information, generating a pseudo-order based upon the associated preference information, generating food preparation information based upon the pseudo-order, and displaying the food preparation information, and a processor operably connected to the camera and the memory for executing the program instructions.

In another embodiment, a method of predicting food preparation requirements includes obtaining customer information, associating the customer information with stored customer specific preference information, generating a pseudo-order based upon the associated preference information, generating food preparation information based upon the pseudo-order and displaying the food preparation information.

In a further embodiment, a system for providing food preparation information includes a detector positioned to detect a vehicle in a drive-thru lane, a memory including program instructions for obtaining customer information from the detector, identifying a specific customer using the customer information, obtaining historical ordering data for the identified customer, predicting a food product to be ordered by the customer, generating food preparation information based upon the prediction, and displaying the food preparation information, and a processor operably connected to the detector and the memory for executing the program instructions.

The above described features and advantages, as well as others, will become more readily apparent to those of ordinary skill in the art by reference to the following detailed description and accompanying drawings.

DETAILED DESCRIPTION

Figure 1:
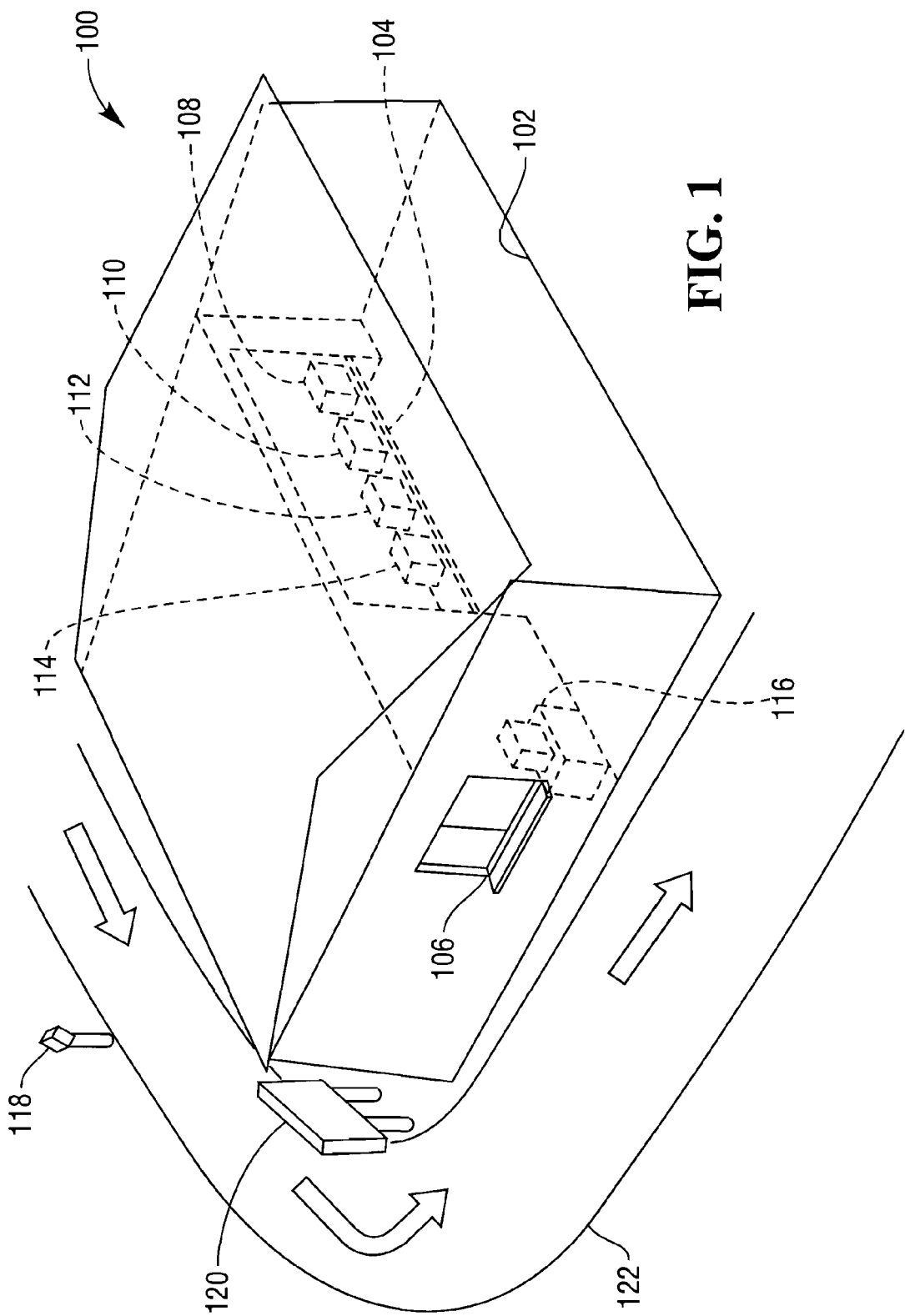
FIG. 1 depicts an elevational perspective view of a restaurant with a drive-thru window.

Referring to FIG. 1, there is depicted a representation of a restaurant generally designated 100. The restaurant 100 includes a seating area 102, a service counter 104 and a drive-thru window 106. Four terminals 108, 110, 112 and 114 are located at the service counter 104 while a fifth terminal 116 is located at the drive-thru window 106. A camera 118 and an ordering station 120 are located alongside a drive-thru lane 122 which extends alongside the drive-thru window 106 outside of the restaurant 100.

Figure 2:
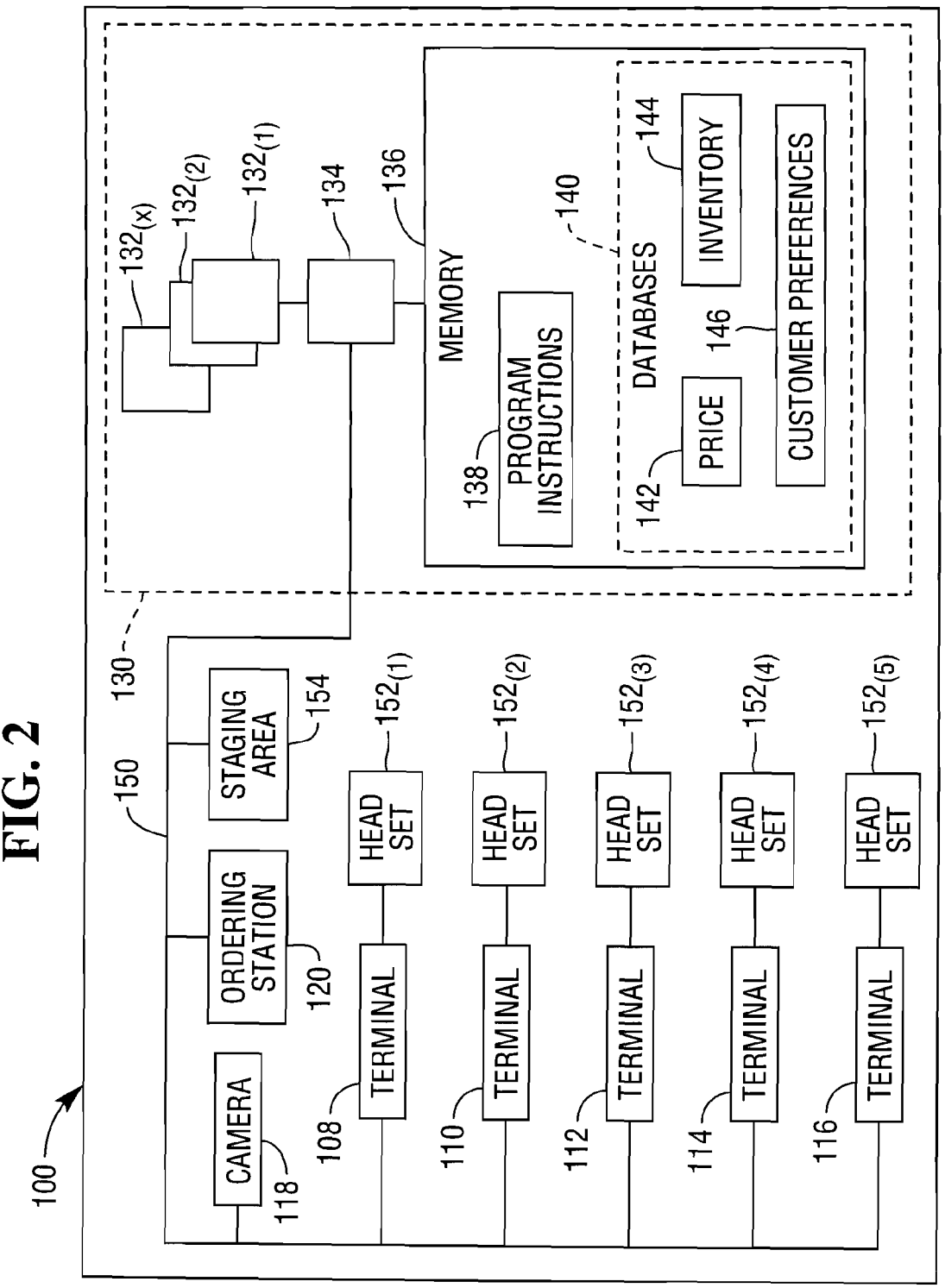
FIG. 2 shows a block representation of the restaurant of FIG. 1 with an exemplary embodiment of a control system in which the subject invention may be used.

A restaurant control system 130 is shown in FIG. 2. The control system 130 includes I/O devices 132, a processing circuit 134 and a memory 136. The I/O devices 132 may include a user interface, graphical user interface, keyboards, pointing devices, remote and/or local communication links, displays, and other devices that allow externally generated information to be provided to the processing circuit 134, and that allow internal information of the control system 130 to be communicated externally.

The processing circuit 134 may suitably be a general purpose computer processing circuit such as a microprocessor and its associated circuitry. The processing circuit 134 is operable to carry out the operations attributed to it herein. Program instructions 138 are stored within the memory 136 along with databases 140. The program instructions 138, which are described more fully below, are executable by the processing circuit 106 and/or any other components as appropriate.

Databases 140 include a price database 142, an inventory database 144, and a customer preference database 146. In one embodiment, the databases 140 are populated using object oriented modeling. The use of object oriented modeling allows for a rich description of the relationship between various objects. While shown as located within the restaurant 100, portions of the control system 130 including any one or more of the databases 140 may be remote from the restaurant 100.

A communications network 150 provides communications between the control system 130 and headsets 152, a staging area 154, the camera 118, the ordering station 120 and the terminals 108, 110, 112, 114 and 116. In the embodiment described herein, the communications network 150 is a wireless communication scheme implemented as a wireless area network. A wireless communication scheme identifies the specific protocols and RF frequency plan employed in wireless communications between sets of wireless devices. To this end, the processing circuit 134 employs a packet-hopping wireless protocol to effect communication by and among the processing circuit 134, the headset 152, the camera 118, the ordering station 120 and the terminals 108, 110, 112, 114 and 116.

The headsets 152 in this embodiment are connected to the processing circuit 134 through a terminal, although other communication schemes may be used. The staging area 154 is a location for staging of food that is to be served. The staging area 154, which may include heat lamps, a refrigeration source, or other environmental control devices may be provided with sensors which generate data indicative of the number and types of food products that are present in the staging area. Such sensors may include weight sensors, optical sensors and the like.

Figure 3:
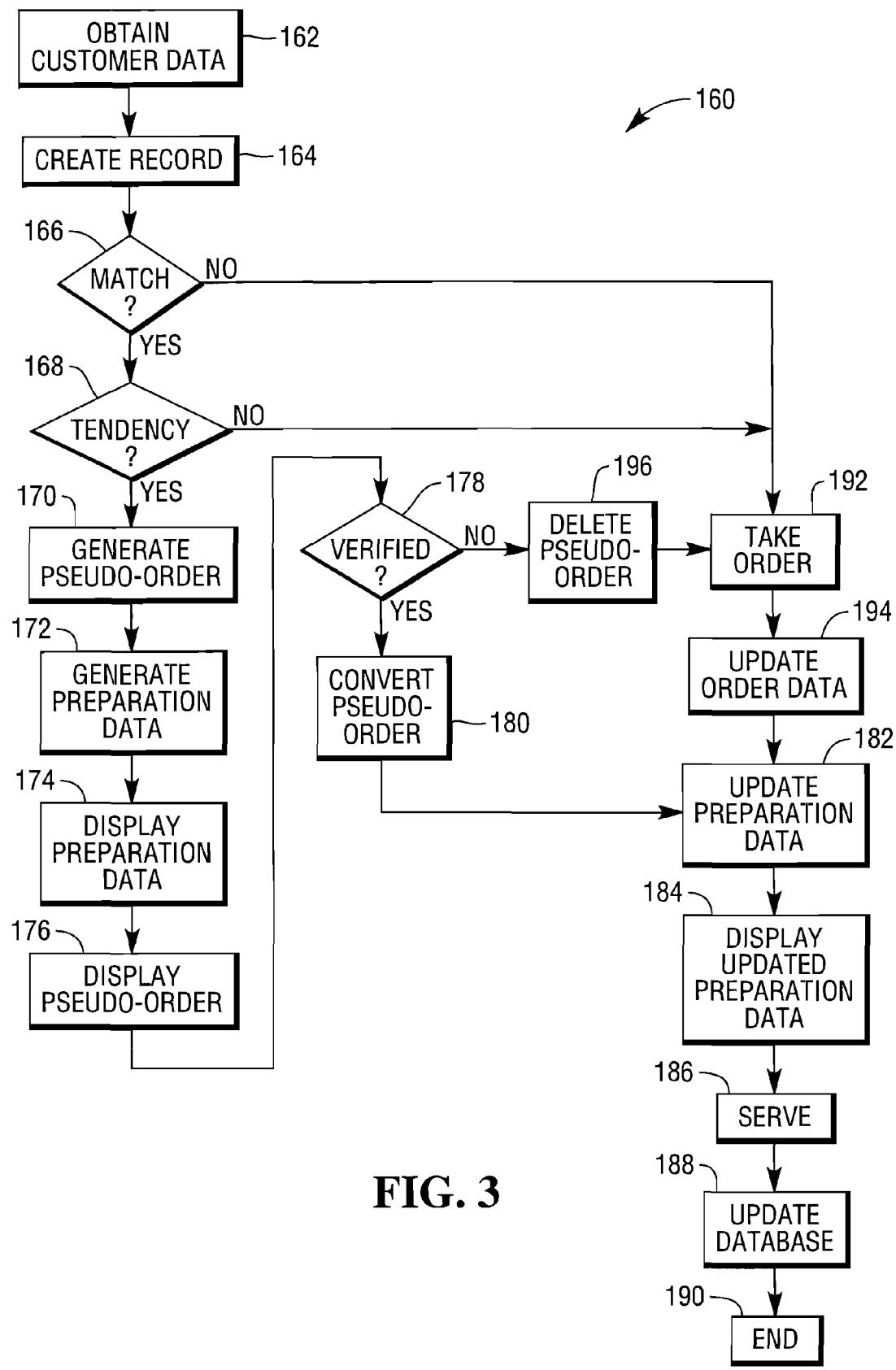
FIG. 3 shows a flowchart of an exemplary process for identifying a customer and associating the identified customer with a stored preference so as to predict the food order of the customer in accordance with principles of the invention.

Referring to FIG. 3, there is depicted a flowchart, generally designated 160, setting forth an exemplary manner of operation of the system shown in FIGS. 1 and 2 by execution of the program instructions 138 by the processing circuit 134 and/or other components described above. At step 162 a customer vehicle approaches the camera 118 within the drive-thru lane 122 and the camera 118 obtains an image of the vehicle. In this embodiment, the camera 118 obtains an image of the license plate of the vehicle. The camera 108 may be positioned to obtain either the front license plate of a vehicle, the rear license plate of the vehicle or both. To this end, more than one camera 118 may be provided. Customer identification may further include identifying the number of passengers in a vehicle.

The image data is transmitted to the processing circuit 134 which performs an image analysis to characterize the obtained image. A record is created at the step 164 using the results of the analysis. The processing circuit 134 then performs a search of the customer preference database 146 at the step 166 to determine if any stored records can be associated with the characterized image. If such stored records are found, the processing circuit 134 determines if the stored records show an ordering tendency. For example, the stored data may indicate that the customer associated with the obtained image always orders a cheeseburger, large fries and a large chocolate milkshake. Alternatively, the stored data may indicate that on weekdays the customer generally orders one group of food products but on weekends the customer orders a different group of products.

In the event that a tendency or preference is identified, the process 160 continues to the step 170 and creates a pseudo-order. As used in this example, a pseudo-order is an order generated based upon the historical ordering habits of the customer associated with the vehicle imaged by the camera 118. Thus, customer specific preferences are the actual historical ordering habits of a particular customer. At the step 172, the processing circuit 134 generates food preparation data. The food preparation data is information indicative of the amount of product that should be placed in-process in consideration of the pseudo-orders and, if desired, other information. In generating food preparation data, pseudo-orders may be assigned a confidence factor or "weight." Thus, if a customer almost always requests a certain food product or combination of products, the pseudo-order may be given a high weight. If a customer generally orders either of two alternative products, each of the alternative products may be given a medium weight.

Once the predicted or pseudo-order is generated and, if desired, assigned a weight, the processing circuit 134 generates food preparation data by combining the pseudo-order with other pseudo-orders and customer orders entered through one of the terminals 108, 110, 112, 114 and 116 which have not been filled. This is the number of the particular product "on-order." Next, the number of product "in-process" is determined. Products "in-process" may include the products that are located in the staging area 154 as indicated by the data from the staging area 154. Additionally, and/or alternatively, the inventory database 144 may be queried to determine the number of products that have been removed from inventory but not yet served.

Using the "on-order" data and the "in-process" data, the processing circuit 134 determines whether or not additional product should be prepared. This determination may include a consideration of the amount of product desired to be maintained in the staging area 154. For example, ten units of a particular product may be desired to be available in the staging area 154 during a certain period of time such as lunch hour while only three units of the particular product are desired at other times. Once the food preparation data has been generated at the step 172, the food preparation data is displayed at the step 174 and restaurant employees can begin any necessary activities to provide sufficient product in the staging area. If desired, an aural and/or visual alarm may be activated upon display of new preparation data.

In the embodiment of FIG. 3, the pseudo-order generated at the step 170 is also displayed at the step 176. The display may be provided at the ordering station 120. For example, when the customer vehicle approaches the ordering station 120, a display may be rendered which asks if the customer would like the products shown on the pseudo-order. Alternatively, the order may be displayed at the terminal 116 located at the drive-thru window 106 for use by restaurant personnel. At the step 178, the processing circuit 134 determines if the order has been verified. Order verification from the customer or an employee may be obtained by any desired input method such as the use of voice recognition software, a touch screen or a physical button.

If the pseudo-order is verified at the step 178, the system changes the status of the pseudo-order at the step 180. This may be accomplished, for example, by changing the pseudo-order to an actual order or by modifying the weight of the pseudo-order. At the step 182, the processing circuit 134 updates the food preparation data that was generated at the step 172 to account for the food products actually ordered by the specific customer and displays the updated preparation data at the step 184.

Thereafter, the food is served at the step 186 and the "on-order" data and "in-process" data is modified to account for the fulfillment of the order. Additionally, at the step 188 the customer preference database 146 is updated to reflect the most recent activity associated with the customer identified at the steps 162, 164 and 166. The data stored may include the time of day, the day of the week, the time of year, whether or not any special promotions were in effect, or any other data useful in predicting an ordering tendency. The process 160 then ends at the step 190.

Returning to the step 166, in the event there are no stored records associated with the customer data obtained at the step 162, then there is no tendency data available and the process continues at the step 192 at which point the customer's food order is taken and entered into the system at the step 194. The process 160 then proceeds in the manner set forth above and ends at the step 190.

Similarly, if at the step 178 the product or products ordered by the customer does not match the product or products identified in the pseudo-order generated at the step 170, then the product or products are deleted from the pseudo-order at the step 196 and the process continues at the step 192 at which point the customer's order is taken and entered into the system at the step 194. The process 160 then proceeds in the manner set forth above and ends at the step 190.

While this invention has been described as having a preferred design, the subject invention can be further modified within the spirit and scope of this disclosure. This application is therefore intended to cover any variations, uses, or adaptations of the subject invention using its general principles.

What is claimed is:

1. A system for generating food preparation prediction information comprising:
   a detector for obtaining customer information prior to a customer reaching an ordering station;
   a memory including program instructions for,
      obtaining customer information from the detector,
      associating the customer information with stored customer specific preference information,
      generating a pseudo-order based upon the associated preference information,
      generating food preparation information indicative of the number of products to be maintained in a staging area based upon the pseudo-order, and
      displaying the food preparation information; and
   a processor operably connected to the detector and the memory for executing the program instructions.

2. The system of claim 1, wherein the memory further includes program instructions for:
   obtaining vehicle identification information from a camera arranged proximate a drive thru lane.

3. The system of claim 2, wherein the memory further includes program instructions for:
   displaying the pseudo-order to the customer on a display at the ordering station;
   receiving verification of the pseudo-order from the customer;
   converting the pseudo-order to a food order; and
   updating the food preparation information.

4. The system of claim 2, wherein the memory further includes program instructions for:
   obtaining food order data;
   assigning a confidence weight to the pseudo-order; and
   generating the food preparation information based upon the weighted pseudo-order and the food order data.

5. The system of claim 2, wherein the memory further includes program instructions for:
   obtaining staging area inventory data; and
   generating the food preparation information based upon the obtained staging area inventory data.

6. The system of claim 1, wherein the memory further includes program instructions for:
   associating the customer information with day specific customer specific preference information.

7. A method of predicting food preparation requirements comprising:
   obtaining customer information utilizing a detector located to detect a customer prior to the customer reaching an ordering station;
   associating the customer information with stored customer specific preference information from a customer database;
   generating a pseudo-order based upon the associated preference information;
   generating food preparation information indicative of the number of products to be maintained in a staging area based upon the pseudo-order utilizing a programmed processor; and
   displaying the food preparation information on a display.

8. The method of claim 7, wherein:
   obtaining customer information comprises obtaining vehicle identification information from a camera arranged proximate a drive thru lane.

9. The method of claim 8, further comprising:
   displaying the pseudo-order to the customer on a display at the ordering station;
   receiving verification of the pseudo-order from the customer;
   converting the pseudo-order to a food order; and
   updating the food preparation information.

10. The method of claim 8, wherein generating food preparation information comprises:
    obtaining food order data;
    assigning a confidence weight to the pseudo-order; and
    generating the food preparation information based upon the weighted pseudo-order and the food order data.

11. The method of claim 10, wherein generating food preparation information further comprises:
    obtaining staging area inventory data; and
    generating the food preparation information based upon the obtained staging area inventory data.

12. The method of claim 7, wherein associating the customer information with stored customer specific preference information comprises;

associating the customer information with day specific customer specific preference information.

13. The system of claim 1 wherein the pseudo-order is used in predicting a number of products to be maintained in a staging area based on historical tendencies of a specific customer identified from the customer information.

14. The system of claim 1 wherein the image includes a license plate of the customer vehicle.

15. The system of claim 14 wherein the camera transmits image data for the image to the processor and customer identification further includes a number of passengers in the customer vehicle.

16. The system of claim 15 wherein the processor performs image analysis upon the image data to characterize the image, and creates and stores a record thereof.

17. The system of claim 16 wherein the processor controls a search of a customer preference database to determine if any stored records can be associated with the characterized image.

18. The system of claim 1, wherein the memory further includes program instructions for determining if stored customer specific preference information shows an ordering preference.

19. The system of claim 18, wherein the memory further includes program instruction for evaluating any determined ordering preference and establishing a weight for the pseudo-order.

20. The system of claim 1, wherein the food preparation information is further based upon at least one other pseudo-order and at least one actual order entered using one of a plurality of ordering terminals.

* * * * *